Aug. 9, 1932.  H. S. COE  1,870,441
DECANTATION APPARATUS
Filed Feb. 17, 1928
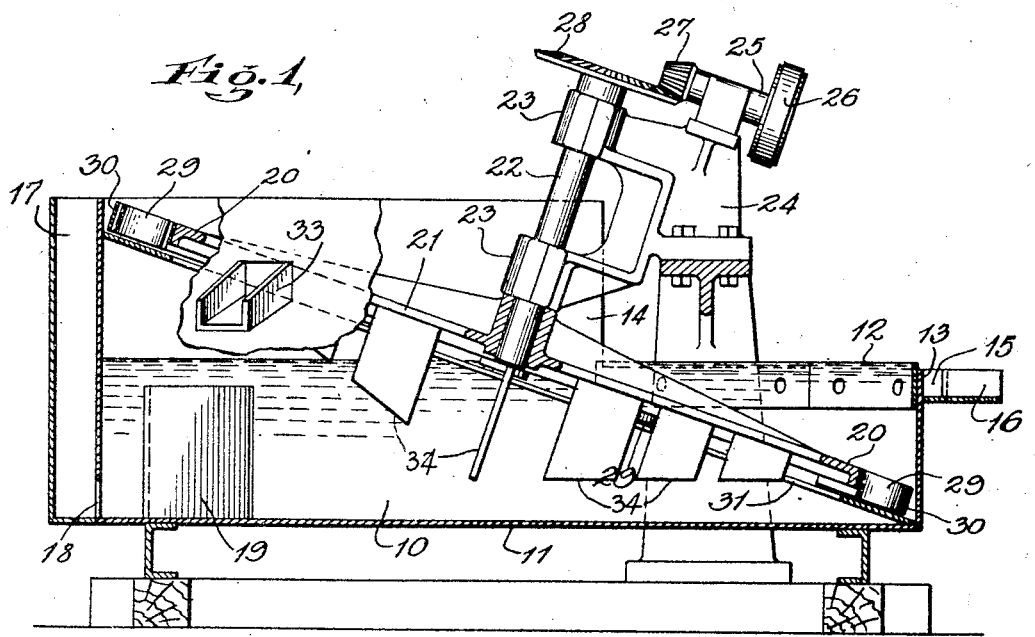
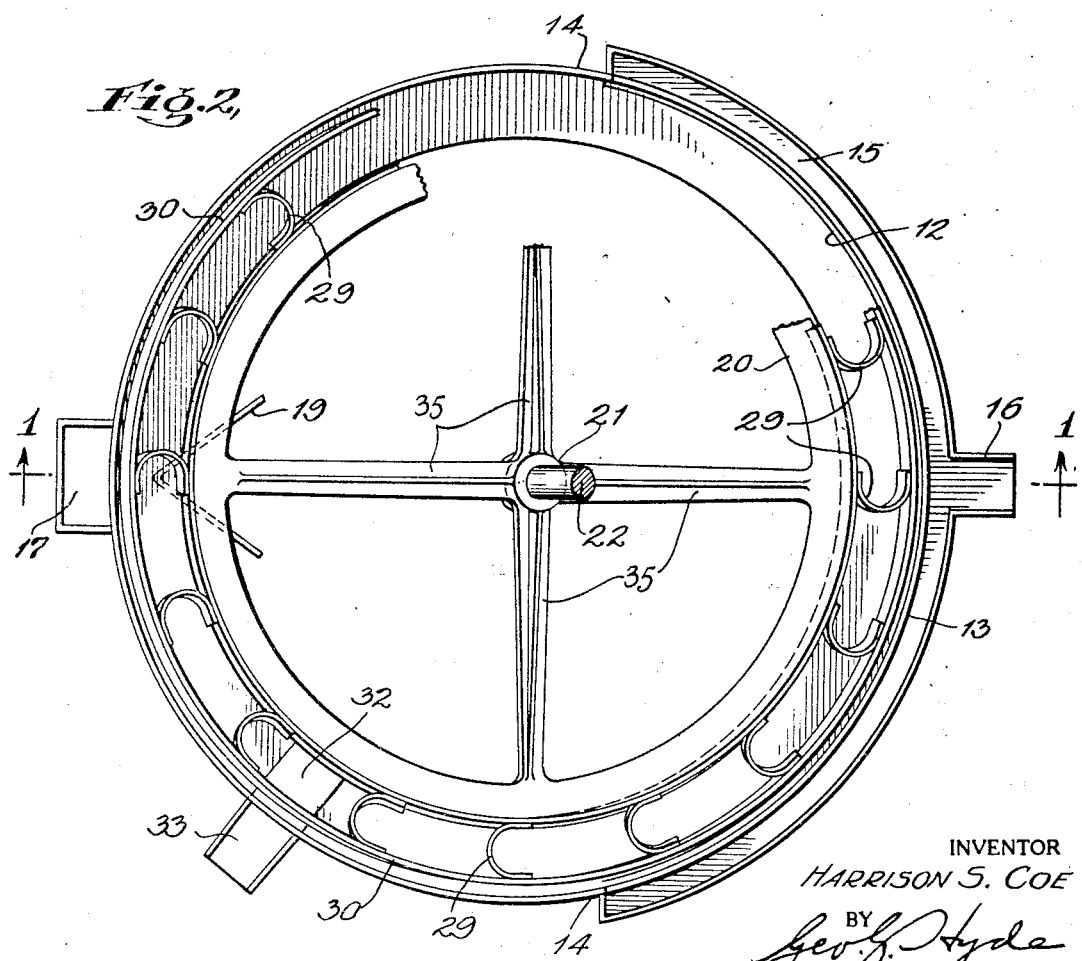
INVENTOR
HARRISON S. COE
BY
Geo. J. Hyde
his ATTORNEY Patented Aug. 9, 1932

1,870,441

UNITED STATES PATENT OFFICE

HARRISON S. COE, OF LA CYGNE, KANSAS

DECANTATION APPARATUS

Application filed February 17, 1928. Serial No. 255,173.

This invention relates to decantation apparatus, and particularly to a machine in which solids settling out of a liquid are mechanically carried along a sloping path to a discharge above the water level, the bulk of the liquid being decanted. Machines operating on this principle are commonly employed as classifiers for separating the coarser, more rapidly settling solids from the finer solids which pass out with the liquid overflow, and are extensively employed in metallurgical and chemical operations, also in sand washing.

The machine herein disclosed is in general an improvement on the apparatus set forth in my Patent No. 1,638,871, and is of the same general type, including in the preferred form a continuous conveyor which may consist of scoops located around the edge of an inclined rotating wheel dipping into a settling compartment and carrying the settled solids along a sloping platform from the bottom of the compartment to a discharge above the water level. The present machine is simpler and more compact, substantially eliminates the chance that oversize solids may be short-circuited from the feed to the overflow, and provides an improved arrangement for drainage of the solids. Numerous other features have been improved, as will be best understood from the following description taken in connection with the accompanying drawing, in which Fig. 1 is a vertical central section along line 1—1 of Figure 2, the solids discharge being however shown in perspective; and Fig. 2 is a plan view of same.

The settling compartment may comprise a tank 10 which may be circular in form, tanks of this shape being readily obtainable commercially, and the tank bottom 11 may be substantially horizontal, facilitating the mounting of the apparatus and providing a more convenient arrangement than the inclined bottom tank shown in the previous application above mentioned. At one side of the tank provision is made for overflowing the supernatant liquid, preferably comprising a lip 12 adjustably mounted in well known manner on the side wall 13 of the tank for the purpose of leveling after the machine is set up so as to produce a uniform overflow the entire length of the lip. This lip preferably extends a substantial distance around the edge of the tank, preferably approaching at its ends the zone where the scoops pass above the liquid as hereinafter described, the overflow being terminated by upwardly extending portions 14 of the side walls 13. An overflow launder 15 is mounted on the side 13 of the tank to receive the overflow passing over the lip 12 and conduct it to a discharge spout 16.

The feed is introduced at a point substantially distant from the overflow lip 12, and preferably at the opposite side of the tank. A convenient arrangement is illustrated, comprising a vertical feed well 17 mounted on the side wall 13 of the tank at a point opposite the discharge spout 16, which in turn is preferably located centrally of the overflow lip 12. The feed passes from well 17 into a tank 10, preferably through a submerged inlet opening 18, and is laterally deflected by a V-shaped vertical baffle 19 opposite the opening, which tends to distribute the current of incoming feed and minimize the resulting disturbance which might interfere with most efficient settling.

The settled solids are carried out of the liquid by means of a rotating conveyor including a rim 20 carried by spider 21 mounted on shaft 22 supported by the bearings 23 carried by a suitable stationary frame 24, which may also carry the drive shaft 25 with the pulley 26 and bevel gear 27 meshing with bevel gear 28 on the end of shaft 22. On rim 20 or its equivalent are mounted a plurality of conveying members which may comprise a plurality of vertical semi-cylindrical scoops 29 supported at their outer ends by ring 30. Central rakes or paddle blades 34 may also be mounted on the arms 35 of spider 21, the blades being mounted along the lower surface of the arms and extending vertically downward, preferably being located close together and having their lower edges in alignment parallel to and adjacent the bottom of the tank when in lower most position.

Immediately beneath the path of the conveying means, such as scoops 29, is located a platform extending from a point near the bottom of tank 10 to a point substantially above the liquid level, the arrangement being such that the scoops will pick up settled solids and carry them along the platform above the liquid level, where surplus water will drain out, and thence to a suitable discharge point on the platform. The preferred arrangement for this platform comprises an annular shelf 31 mounted on the inner wall of the tank 10 and extending from the bottom edge of the tank beneath the discharge spout 16 to a point at the opposite side of the tank substantially above the water level, the outer edge of the shelf being continuously joined to the wall of the tank while the inner edge is located adjacent the path of the inner edges of the scoops 29 or their equivalent.

Suitable means for discharging the solids carried by the scoops 29 is provided, the preferred form comprising an opening 32 extending across the shelf 31 and an inclined discharge chute 33 extending beneath the opening 32 and through the side of the tank. Opening 32 is preferably located in the general neighborhood of the point where the scoops reenter the liquid, so as to provide maximum drainage for the solids, and particularly should be located beyond the highest point of the shelf 31 for the same reason.

In operation the pulp or mixture of solids suspended in liquid is fed in fluid form to feed well 17 and passing through opening 18 is deflected laterally by baffle 10 and passes across the tank 10, the larger solids settling out and the finer solids, including dirt, wood, etc. where the machine is used for sand washing, are discharged with the overflow, passing over lip 12 into launder 15 and through discharge spout 16. The settled solids will build up until they rest upon shelf 31, the flow of the feed tending to sweep the solids into position on the shelf. The blades 34 serve to prevent accumulation of settled solids in a central zone defined by their path, thereby providing more uniform flow from the inlet 18 to the overflow zone. The paddles furthermore have a certain stirring or agitating effect which can be controlled by suitable variations in the width and length of the paddles, such agitation being beneficial in producing a proper washing and classifying effect with many materials.

The scoops 29 carry the solids counterclockwise in the form illustrated along shelf 31 to a point above the water level, where the surplus water drains over the edge of the shelf 31 directly into the body of liquid in the tank 10, the solids being held in the scoops as they pass along the shelf until they fall through opening 32 into chute 33. With the arrangement illustrated it will be understood that the bottom edges of scoops 29 are located quite close to shelf 31 to prevent loss of load during drainage while the rim 20 has sufficient clearance to permit free access of the solids to the path of the scoops 29.

It will be evident that many changes in the type of conveyor, the arrangement of the shelf or platform and the arrangement of feed and discharge may be employed within the scope of the invention without departing therefrom as set forth in the appended claims.

I claim:

1. Decantation apparatus for separating solids from liquids including an annular inclined platform, a settling compartment in association therewith positioned to receive material passing through said annular platform, and means for conveying settled solids from the compartment along the platform to a point of discharge above the liquid level.

2. Decantation apparatus for separating solids from liquids comprising a settling compartment and means for conveying solids settled in the compartment to a point of discharge above the liquid level, including a mechanical conveyor and an inclined platform along which the settled solids are conveyed, said platform having a lateral edge adjacent the path of the solids and located above the settling compartment for return thereto of material passing over said edge.

3. Decantation apparatus for separating solids from liquids including a settling compartment, a platform above the bottom of the compartment and along which settled solids are propelled to a point of discharge above the liquid level and having a free lateral edge immediately above the liquid in the compartment; and means for continuously propelling solids along the platform.

4. Decantation apparatus for separating solids from liquids including a settling compartment, an inwardly projecting shelf mounted along the inner wall of said compartment above the bottom thereof and extending from a point beneath the liquid level to a point above the liquid level; and mechanical means for propelling settled solids along the shelf to a point of discharge.

5. Decantation apparatus for separating solids from liquids including a settling compartment, an inclined platform in said compartment extending above and below the water level and above the bottom of said compartment, and means for propelling settled solids upwardly along the platform to a point of discharge, a portion of the platform adjacent the point of discharge being downwardly inclined in a direction transverse to the path of the solids for drainage of liquid therefrom.

6. Decantation apparatus for separating solids from liquids, including a settling compartment, a platform located in a plane at an angle to the surface of the liquid in the compartment and extending above the compartment bottom above and below said surface, a conveyor element for impelling the settled solids along the platform to a point of discharge above the liquid level, and means for moving the conveyor member in a circular path parallel to the plane of the platform and directly above same.

7. Apparatus for separating settled solids from liquids comprising a settling compartment, an annular inclined platform extending above and below the liquid level in the compartment, means for carrying settled solids upwardly along the platform to a point of discharge, and a submerged means for introducing feed to the compartment below the platform.

8. Apparatus for separating settled solids from liquids comprising an inclined platform, rotary conveying mechanism travelling in a continuous path along the platform, said platform having an opening with its edge adjacent the inner edge of said path, a sedimentation compartment below said opening and a submerged feed for said compartment whereby liquid-flow takes place upwardly through said opening.

9. Decantation apparatus for separating solids from liquids, including a settling compartment, an inclined platform extending above the compartment bottom above and below the liquid level, means for carrying settled solids along the platform to a point of discharge above the liquid level, an overflow for decanting liquid from the compartment adjacent the submerged portion of the platform, and means for introducing feed into the compartment adjacent the portion of the platform located above the liquid level.

10. Decantation apparatus for separating solids from liquids including a settling compartment, an inclined solids discharge platform extending substantially from the bottom of the compartment at one side to a point above the liquid level at the opposite side and across less than the full width of the settling zone in said compartment so as to permit material to be conveyed onto the lower end of said platform from the rear thereof, and means for conveying settled solids along the platform to a point of discharge.

11. Decantation apparatus for separating solids from liquids, including a settling compartment, a platform extending inwardly from the walls of the compartment throughout the entire periphery thereof located in an inclined plane with a portion of the platform submerged; conveying means rotating about an axis at right angles to the plane of the platform and adapted to convey settled solids along the platform to a point of discharge above the liquid level, said platform having a drainage opening for the return of material to the body of material in the settling compartment.

12. Decantation apparatus for separating solids from liquids including a settling compartment, an inclined platform located in said compartment extending above and below the liquid level, and conveying means moving in a circular path along the platform for carrying settled solids to a point of discharge above the liquid level, said platform having a circular opening with its edge adjacent the path of the conveying means and arranged to return drainage from the material upon said platform to the material in the settling compartment.

13. Decantation apparatus for separating solids from liquids including a settling tank, means for introducing feed at one side of the tank, means for overflowing supernatant liquid at the opposite side, an inclined platform in the tank extending from a point adjacent the bottom at the overflow side to a point above the liquid level at the feed side, and a plurality of scoops rigidly mounted for rotation about a central axis in a circular path along the platform adapted to convey settled solids to a point of discharge above the liquid level, the platform having a curved inner edge adjacent the path of the scoops.

14. Decantation apparatus for separating solids from liquids including a settling compartment, means for decanting supernatant liquid at one side of the compartment, means for introducing feed adjacent the bottom of the opposite side of the compartment, deflecting means in the compartment in line with the influent feed for deflecting the feed current laterally, an inclined platform in the compartment extending from a point below the liquid level at the overflow side to a point above the liquid level, and means for conveying settled solids along the platform to a point of discharge.

15. Decantation apparatus for separating solids from liquids comprising a vertical substantially cylindrical settling tank, an overflow lip extending around a portion of the tank, a feed inlet spaced from the overflow lip, an inclined platform extending along the walls of the tank from the bottom of the tank at a point adjacent the overflow lip to a point substantially above the liquid level at the opposite side of the tank, said platform having an opening for the discharge of drained solids above the liquid level and an opening for the passage of feed from the feed inlet to the overflow lip and the return of material from the platform to the tank; and buckets traveling in a circular path along the platform for conveying settled solids to the discharge opening.

16. Decantation apparatus for separating solids from liquids comprising a settling tank, an overflow lip, a feed inlet spaced from said lip, rotary means for removing settled solids, and separate blades mounted to rotate with said rotary means and traveling below the liquid level between the inlet and overflow lip for agitation of suspended solids.

17. Apparatus for separating settled solids from liquids comprising a settling compartment, a feed therefor, a decanting outlet therefrom, annular inclined rotary means for mechanically removing settled solids from said compartment, and agitating means extending into said compartment propelled from said rotary means.

18. Apparatus for separating settled solids from liquids comprising a settling compartment, a feed therefor, a decanting outlet therefrom, annular inclined rotary means for mechanically removing settled solids from said compartment, and bladed agitating means extending into said compartment rotated from said rotary means.

19. Apparatus according to claim 18 in which said bladed means has paddle blades of different depth.

In testimony whereof I affix my signature.

HARRISON S. COE.